United States Patent
Romano et al.

(10) Patent No.: US 12,312,150 B2
(45) Date of Patent: May 27, 2025

(54) THERMAL CONTAINER

(71) Applicants: Elvezio Romano, Karibib (NA); Srecko Radosavljevic, Bellinzona (CH); Alberto Dell'acqua, Grono (CH); Fabiana Demaldi, Torre (CH)

(72) Inventors: Elvezio Romano, Karibib (NA); Srecko Radosavljevic, Bellinzona (CH); Alberto Dell'acqua, Grono (CH); Fabiana Demaldi, Torre (CH)

(*) Notice: Subject to any disclaimer, the term of this patent is extended or adjusted under 35 U.S.C. 154(b) by 476 days.

(21) Appl. No.: 17/787,141

(22) PCT Filed: Dec. 19, 2019

(86) PCT No.: PCT/IB2019/061108
§ 371 (c)(1),
(2) Date: Jun. 17, 2022

(87) PCT Pub. No.: WO2021/123890
PCT Pub. Date: Jun. 24, 2021

(65) Prior Publication Data
US 2023/0016269 A1   Jan. 19, 2023

(51) Int. Cl.
| B65D 81/34 | (2006.01) |
| A47J 41/00 | (2006.01) |
| B65D 81/38 | (2006.01) |
| F16K 17/00 | (2006.01) |

(52) U.S. Cl.
CPC ...... *B65D 81/3484* (2013.01); *A47J 41/0044* (2013.01); *A47J 41/0072* (2013.01); *B65D 81/3841* (2013.01); *F16K 17/003* (2013.01)

(58) Field of Classification Search
CPC .... B65D 81/34; B65D 75/00; B65D 81/3484; B65D 75/008; F25D 5/02; F25D 5/00; F24V 30/00
USPC ...................... 206/219; 126/263.01
See application file for complete search history.

(56) References Cited

FOREIGN PATENT DOCUMENTS

| EP | 1164092 A2 * | 12/2001 | ......... B65D 75/5838 |
| EP | 2619279 A1 | 7/2013 | |
| WO | WO-2015033179 A1 * | 3/2015 | ............. A47J 36/28 |

* cited by examiner

*Primary Examiner* — Anthony D Stashick
*Assistant Examiner* — Raven Collins
(74) *Attorney, Agent, or Firm* — Jason L DeFrancesco (57) ABSTRACT

The present invention relates to a portable thermal container (1) for consumer products (2') comprising at least a storing chamber (2) of the consumer products (2') and at least a reaction chamber (4) of a reagent component (5') and a of a reactive component (5"), wherein the reaction chamber (4) extends substantially entirely along the dimension of the largest dimension of the portable thermal container (1) and the storing chamber (2) is arranged side-by-side to the reaction chamber (4) to maximize the thermal exchange between the reaction chamber (4) and the storing chamber (2) in an homogeneous way, and the reaction chamber (4) comprises at least a storing portion and at least an expansion portion, wherein the total volume of said expansion portions is greater than the total volume of said storing portions to allow the safe expansion of the chemical reaction gases in said reaction chamber (4).

14 Claims, 7 Drawing Sheets

THERMAL CONTAINER

FIELD OF THE INVENTION

The present invention relates to a portable container for consumer products.

In particular, the present invention relates to a container of a thermal type able to carrying out a heating or cooling thermal reaction, respectively for heating or cooling the consumer products.

BACKGROUND ART

Consumer products, of the liquid or pasty type, are frequently arranged in suitable containers that allow their storage and handling. In particular, containers of the portable type, often of the single-dose type, allow users to dispose of the consumer product in any place and at any time.

To allow optimal consumption of consumer products, portable thermal containers have been developed that are capable of heating or cooling the consumer product itself, respectively by making use of an exothermic or endothermic chemical reaction.

The portable containers for consumer products of the aforementioned type are used in food, medical and pharmaceutical fields for any type of application, including recreational-sports, healthcare, humanitarian assistance or for military use.

The Patent Application EP1164092 describes a container provided with a first compartment for consumable products which is arranged side-by-side to a second compartment housing a reagent component and a reactive component, such reagent and reactive components are capable of generating a heating or cooling chemical reaction when in contact.

The Patent Application EP2619279 describes a portable thermal container of the aforementioned type made according to the concept of the "bag-in-bag", wherein the compartment suitable for housing the components carrying out the heating or cooling chemical reaction are arranged within the compartment suitable for housing the consumer product to be heated or cooled.

These solutions allow the heating or the cooling of the consumer product by the temperature gradient generated through the chemical reaction, but they do not optimally manage the heat exchange. In particular, the heating or the cooling of the consumer product is mainly localized in the trigger portion of the chemical reaction thus resulting in a lack of uniformity of temperature of the consumer product itself.

Furthermore, these solutions do not allow an optimal management of the compartment housing the components carrying out the heating or cooling chemical reaction, leaving to the expansion ability of the compartment the containment of the chemical reaction gases, which develop in particular in the phase of heating.

It would therefore be desirable to have a portable container for consumer products capable of minimizing the above-mentioned drawbacks. In particular, it would be desirable to have a portable thermal container capable of improving the heat exchange between the consumer product and the compartment housing the components carrying out the heating or cooling chemical reaction. Furthermore, it would be desirable to have a portable thermal container capable of improving the safety of use during the carrying out of the chemical reaction.

SUMMARY OF THE INVENTION

The object of the present invention is to provide a portable thermal container for consumer products able to minimize the aforementioned drawbacks.

In particular, an object of the present invention is to provide a portable thermal container for consumer products able to ensure uniformity of temperature in the heating or cooling of the consumer products.

A further object of the present invention is to provide a portable thermal container for consumer products with a reduced production cost, able to ensure an effective management of the chemical heating or cooling reaction able to maintain a high level of safety.

The aforesaid objects are achieved by a portable thermal container for consumer products, according to the appended claims.

The portable thermal container for consumer products comprising at least a storing chamber of the consumer products and at least a reaction chamber of a reagent component and of a reactive component, wherein the storing chamber and the reaction chamber are hermetically separated, wherein the reagent component and the reactive component are separated from each other and able to carry out a chemical heating or cooling reaction when in contact, respectively to heat or to cool the consumer products, and wherein the reaction chamber extends substantially entirely along the dimension of the largest dimension of the portable thermal container and the storing chamber is arranged side-by-side to the reaction chamber to maximize the thermal exchange between the reaction chamber and the storing chamber in a homogeneous way, the container is characterized in that the reaction chamber comprises at least a storing portion, each comprising the reagent component and/or the reactive component, and at least an expansion portion, devoid of the reagent component and of the reactive component, and wherein the total volume of the expansion portions is greater than the total volume of the storing portions to allow the safe expansion of the chemical reaction gases in the reaction chamber.

In this way, it is possible to ensure the safe expansion of the chemical reaction gases, considerably reducing the risks associated with the tearing or explosion of the reaction chamber. Furthermore, the volume available in the reaction chamber allows a better distribution of the chemical reaction results allowing a homogeneous management of the temperature of the whole container.

Preferably, the reaction chamber is made in the central section of the portable thermal container, and wherein the storing chamber is arranged perimetrical to the reaction chamber along the largest dimension.

Even more preferably, the storing chamber is arranged perimetrical to the reaction chamber along and perpendicular to the largest dimension.

In this way, it is possible to change the temperature of the consumer product by reducing or eliminating the contact with the walls of the reaction chamber itself by the user.

Preferably, the storing chamber is made in the central section of the portable thermal container, and wherein the reaction chamber is arranged perimetrical to the storing chamber along the largest dimension.

Even more preferably, the reaction chamber is arranged perimetrical to the storing chamber along and perpendicular to the largest dimension.

In this way, it is possible to better isolate the consumer product from the external environment temperature.

Preferably, the reaction chamber is symmetric with respect to an axis of symmetry defined along the largest dimension of the thermal container.

The symmetry with respect to the axis of symmetry which is defined along the largest dimension allows to obtain a more uniform temperature management for the consumer product, at the same time arranged symmetrically with respect to the reaction chamber.

Preferably, the reagent component and the reactive component are adjacent arranged in the storing portion.

Alternatively, the reagent component is arranged in a first storing portion and the reactive component is arranged in a second storing portion, and the expansion portion is interposed between the first storing portion and the second storing portion.

The distance between the first storing portion and the second storing portion allows to increase the contact speed between the two products carrying out the chemical reaction and, consequently, the development of a more balanced reaction since its early stage.

Preferably, the storing portion is separated from the expansion portion by a dividing element.

In this way, it is possible to activate the reaction only after the removal or the motion of the dividing element.

Preferably, the total volume of the storing portions is less than or equal to 30% of the total volume of the expansion chamber, preferably less than or equal to 22% of the total volume of the expansion chamber.

Such a volume partitions ensures an appropriate expansion of the chemical reaction gases, maintaining a high level of safety and uniformity of temperature.

Preferably, the reagent component is operatively connected to actuating means able to arrange the reagent component in contact with the reactive component for carrying out the chemical reaction.

Even more preferably, the reagent component is contained within a containment element operatively connected to the actuating means, and wherein the actuating means has a predetermined actuating load and is able to arrange the reagent component in contact with the reactive component for carrying out the chemical reaction upon exceeding the predetermined actuating load.

Preferably, the actuating means is arranged at the opening means of the storing chamber.

In this way, the user can activate the heating or the cooling operating the opening of the containment chamber for consumer products.

Preferably, the portable thermal container comprises a safety valve operatively connected with the reaction chamber for the expulsion of the chemical reaction gases when the pressure inside the reaction chamber exceeds a predetermined pressure value.

In this way, even in case of excessive internal pressure, the consumer product remains separate from the chemical reaction components.

Preferably, the thermal container comprises a perimetrical interspace.

In this way, it is possible to better isolate the container from the external environment and from the handling of the user.

DESCRIPTION OF THE FIGURES

These and further features and advantages of the present invention will become apparent from the disclosure of the preferred embodiments, illustrated by way of a non-limiting example in the accompanying figures, wherein.

DETAILED DESCRIPTION OF THE INVENTION

The term "consumer product" means, in the present invention, any product capable of satisfying the needs of a user, typically in the food, beverage, chemical, pharmaceutical, cosmetic and hygiene fields.

With reference to FIGS. 1-12, the preferred embodiments of the portable thermal container 1 according to the present invention are illustrated.

In the following the same numbering will be kept in the description of the above embodiments, if reference to the same elements is made.

Figure 1:
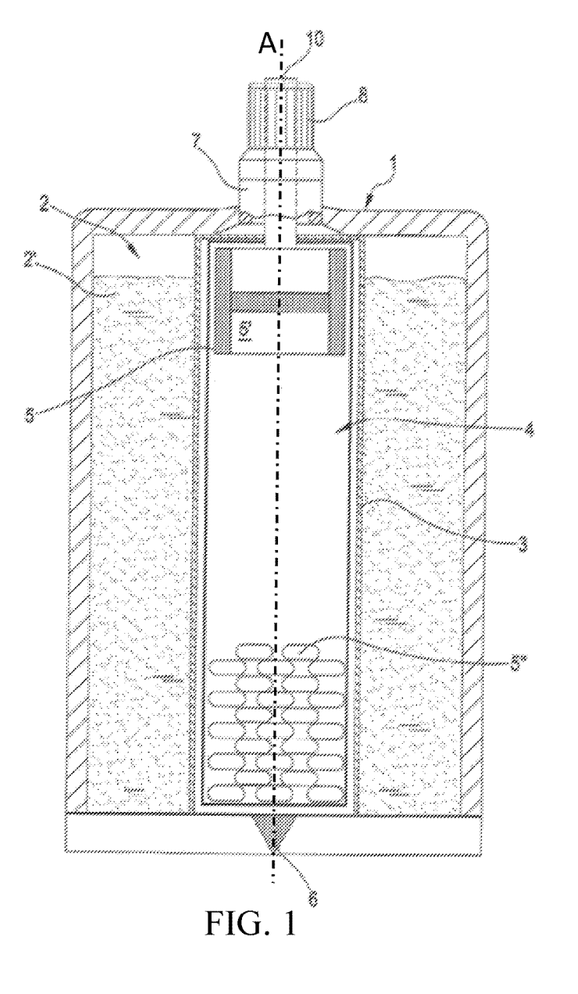
FIG. 1 is a schematic section view of the portable thermal container in a first embodiment, according to the present invention.

FIG. 1 illustrates a first embodiment of the portable thermal container 1 for consumer products 2', preferably made of flexible multilayer material, such as a multilayer plastic film laminated with aluminum. It is also possible to make use of other materials for the realization of the aforementioned portable thermal container, such as to make a container with rigid or semi-rigid walls.

The portable thermal container 1 comprises a storing chamber 2 and a reaction chamber 4, hermetically separated from each other. This separation is obtained through partition walls 3, which can be made as welds on the same material which defines the walls of the portable thermal container, as well as through the insertion of different elements subsequently fixed to the internal walls of the aforementioned container. In particular, the storing chamber 2 allows the storage of the consumer product 2', while the reaction chamber 4 allows the storage of the reagent component 5' and of the reactive component 5" able to carry out a chemical reaction. Indeed, the reagent component 5' and the reactive component 5" are separated from each other and able of to carry out a heating or cooling chemical reaction when in contact.

The consumer product 2', illustrated in a semi-solid (pasty) form but equally from a product in any physical form, is therefore suitable for being heated or cooled according to the chemical reaction described above.

Taking into consideration the extension of the portable thermal container 1 along its largest dimension, or along the axis A as in FIG. 1, the reaction chamber 4 extends substantially along the entire aforementioned largest dimension. In the same way, the storing chamber 2 also extends along the entire largest dimension of the portable thermal container 1 and, in particular, it is arranged side-by-side to the reaction chamber 4. In the first embodiment, described therein, the largest dimension corresponds with the development of the container 1 with respect to its opening means 8, which is the cap capable to ensure access to the storing chamber 2 and the related consume product 2'. In the same way, the container according to the present invention could have the greatest dimension perpendicularly, or in any case transversely, with respect to the opening means or still it could have more than one largest size.

As illustrated in FIG. 1, the reaction chamber 4 is made in the central section of the portable thermal container 1, arranging a storing chamber 2 on its perimeter. This arrangement maximizes the homogeneous heat exchange between the reaction chamber 4 and the storing chamber 2 during the chemical reaction. In particular, the perimeter arrangement is made alongside the walls which extend along the largest dimension of the container 1, i.e. the lateral walls, while leaving free the walls perpendicular to these and opposite to each other, i.e. the bottom wall and the top wall. In this way, it is possible to change the temperature of the consumer product 2' by reducing or eliminating the contact with the walls of the reaction chamber itself by the user. Furthermore, the reaction chamber 4 is symmetrical with respect to the axis of symmetry, along the largest dimension, of the thermal container 1 obtaining a more uniform temperature management for the consumer product 2' which is arranged, at the same time, symmetrically with respect to the reaction chamber 4.

It is possible to identify in greater detail the technical features of the reaction chamber 4 of the container 1 according to the present invention. This comprises at least a storing portion and at least an expansion portion, said portions being defined according to the products stored therein even without a physical separation between them. The storing portion corresponds to the portion of the reaction chamber 4 which comprises the reagent component 5' and/or the reactive component 5", while the expansion portion corresponds to the portion of the reaction chamber 4 devoid of the reagent component 5' and of the reactive component 5". Furthermore, the total volume of the expansion portions is greater than the total volume of the storing portions to allow for the safe expansion of the chemical reaction gases in the reaction chamber 4. The safe expansion of the chemical reaction gases considerably reduces the risks associated with the tearing or explosion of the reaction chamber 4 and of the whole container 1. Furthermore, the available free volume in the reaction chamber 4 allows a better distribution of the components of the chemical reaction allowing a homogeneous management of the temperature along the whole container.

In particular, the aforementioned first embodiment comprises a first and a second storing portions and a single expansion portion, wherein the reagent component 5' is disposed in the first storing portion and the reactive component 5" is disposed in the second storing portion, while the expansion portion is interposed between the first storing portion and the second storing portion. The aforementioned separation between the two storing portions allows a travel by gravity of the reagent component 5' for a distance equal to the dimension of the expansion portion till the contact with the reactive component 5" arranged in the second storing portion, thereby increasing the speed of contact between the two components carrying out the chemical reaction and, consequently, the development of a more balanced reaction from its early stage.

Although the volumetric separation between the aforesaid portions is not easy to be inferred from FIG. 1, preferably, the total volume of the storing portions is less than or equal to 30% of the total volume of the expansion chamber 4. Even more preferably the total volume of the storing portions is less than or equal to 22% of the total volume of the aforesaid expansion chamber 4. Such a separation of volume guarantees an appropriate expansion of the chemical reaction gases, so that a high level of safety and uniformity of temperature can be achieved.

In the first embodiment described therein, the reagent component 5' is operatively connected to actuating means 10 able to arrange the reagent component 5' in contact with the reactive component 5" to carry out the chemical reaction. In particular, the reagent component 5' is contained within a containment element 5, illustrated in a closed configuration, operatively connected to the aforementioned actuating means 10. The latter are arranged at the opening means 8 of the storing chamber 2, as well as of the top wall, and comprise an element 10 concentric to both the cap 8 and the relative support neck 7. In this way, the user can activate the heating or the cooling when the opening of the storing chamber 2 of the consumer products 2' is operated. Further embodiments are also possible, falling within the inventive concept of the present invention.

The actuating means 10 therefore has a predetermined actuating load and are able to arrange the reagent component 5' in contact with the reactive component 5" to carry out the chemical reaction when the aforesaid predetermined actuating load is exceeded.

Finally, the portable thermal container 1 according to the present first embodiment comprises a safety valve 6 operatively connected with the reaction chamber 4 for the expulsion of the chemical reaction gases, in case of when the pressure inside the reaction chamber 4 itself exceeds a predetermined pressure value. In this way, the consumer product 2' remains separate from the components of the chemical reaction allowing its subsequent use, even in the event of excessive internal pressure and subsequent leakage of the components of the chemical reaction.

The arrangement between the reagent component and the reactive component can be modified, of course, without altering the inventive concept of the present invention. Furthermore, the type of reagent component and of reactive component can be selected according to the technical needs, for example according to the needs of an exothermic or endothermic reaction development, as well as according the temperature gradient to be reached, usually in the range between −20° C. and +50° C.

Figure 1A:
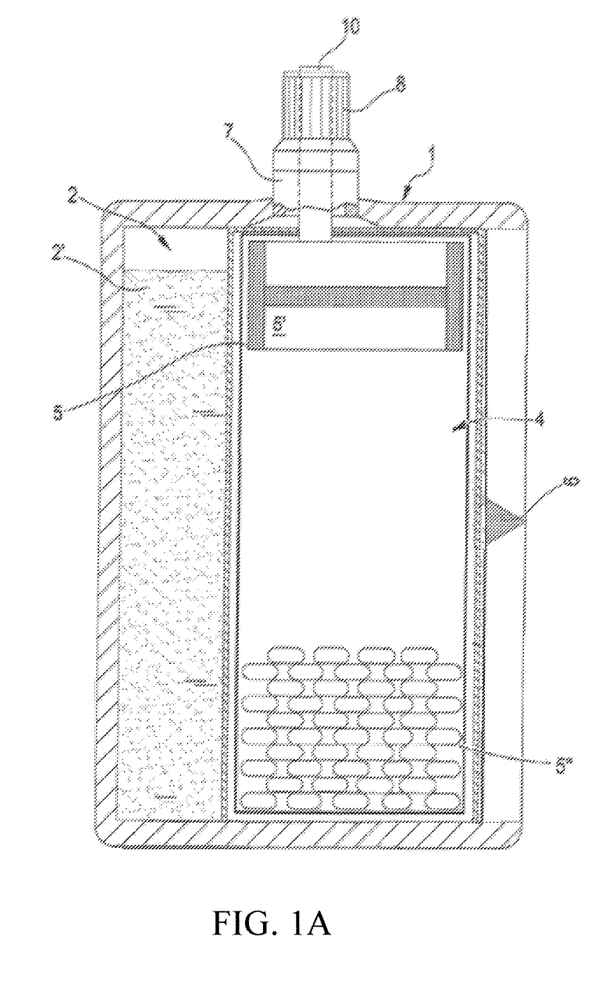
FIG. 1A is a schematic section view of the portable thermal container of the first embodiment of FIG. 1, wherein the reaction chamber entirely takes the largest dimension.

The FIG. 1A illustrates one of the possible embodiments of the portable thermal container 1. According to this embodiment, the reaction chamber 4 entirely extends along the dimension perpendicular to the largest dimension, as will be subsequently described for the eighth and ninth embodiments, respectively illustrated in FIGS. 8 and 9. In particular, in FIG. 1A the reaction chamber 4 is drafted as extending perpendicularly to the axis A of symmetry only in a portion thereof, to allow the visualization of the storing chamber 2, but the extension of the reaction chamber 4 could equally be along the whole aforementioned perpendicular dimension.

In the following, the further embodiments will be described only with regard to significant variations with respect to the embodiments described above.

Figure 2:
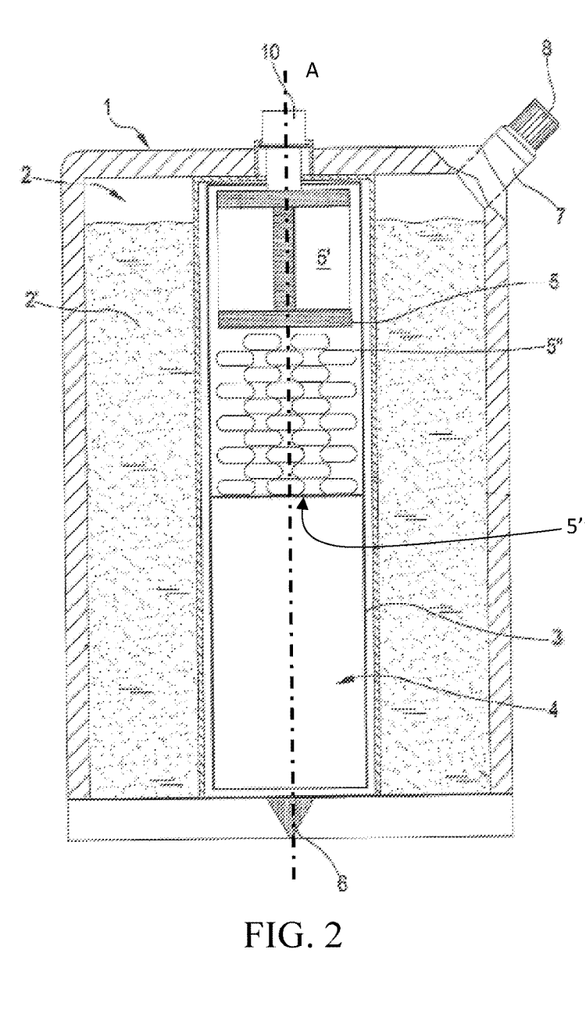
FIG. 2 is a schematic section view of the portable thermal container in a second embodiment, according to the present invention.

The second embodiment of the portable thermal container 1 for consumer product 2', illustrated in FIG. 2, has features similar to the portable thermal container discussed in the first embodiment, wherein the difference reside in the positioning of the opening means 8 and in the physical separation of the reaction chamber 4 in the respective storing and expansion portions, as described below in greater detail.

The reagent component 5' is operatively connected to actuating means 10 able to arrange the reagent component 5' in contact with the reacting component 5" to carry out the chemical reaction. In particular, the reagent product 5' is contained within a containment element 5, illustrated in an open configuration, which is operatively connected to the aforementioned actuating means 10. Unlike what is illustrated in the first embodiment of FIG. 1, the actuating means 10 is arranged at the top wall symmetrically to the arrangement of the reaction chamber 4 with respect to the axis A of symmetry, and the opening means 8 of the storing chamber 2 are separated from the actuating means 10, in particular arranged at the angular portion of the top wall of the container 1. In this way, the actuation of the actuating means 10 must be carried out in a different position from the opening of the storing chamber 2.

Despite the arrangement of the opening means 8 in an asymmetrical position with respect to the container 1, the arrangement of the reaction chamber 4, and consequently of the storing chamber 2, is however considered substantially symmetrical.

Another difference consists in the positioning of the reagent component 5' and of the reactive component 5" within the reaction chamber 4, or within the portions that constitute said reaction chamber 4. In fact, in the container 1 of the second embodiment, the reagent component 5' and the reactive component 5" are arranged adjacent to the storing portion. In addition, the storing portion is separated from the expansion portion by a dividing element 5'''. In this way, it is possible to carry out the reaction only upon the removal or moving of the dividing element.

Figure 3:
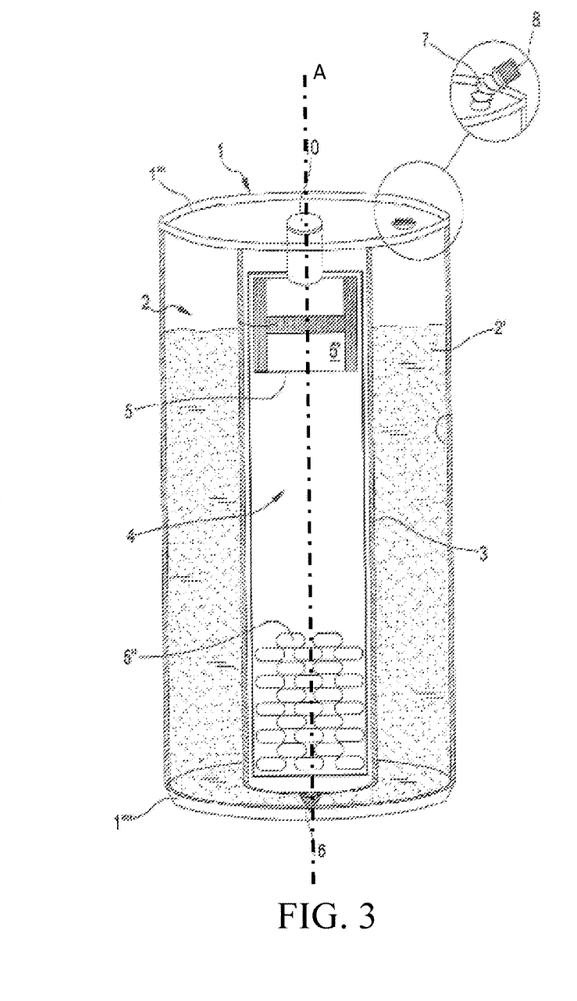
FIG. 3 is a schematic section view of the portable thermal container in a third embodiment, according to the present invention.

The third embodiment of the portable thermal container 1 for consumer product 2', illustrated in FIG. 3, has features similar to the portable thermal container discussed in the first embodiment, with differences in the positioning of the opening means 8 and in the presence of suitable edges in the bottom and top walls, as described in more detail below.

The reagent component 5' is operatively connected to actuating means 10 able to arrange the reagent component 5' in contact with the reactive component 5" to carry out the chemical reaction. In particular, the reagent component 5' is contained within a containment element 5, illustrated in a closed configuration, operatively connected to the aforementioned actuating means 10. Unlike what is illustrated in the first embodiment of FIG. 1, the actuating means 10 is arranged at the top wall symmetrically to the arrangement of the reaction chamber 4 with respect to the axis A of symmetry, and the opening means 8 of the storing chamber 2 is separated from the actuating means 10, in particular arranged at one side of the top wall of the container 1. Furthermore, the opening means 8 are defined by a flexible body 7 provided with a cap 8, substantially defining a straw part integral with the container 1 itself and movable from a rest position, flattened within the top wall, to a working position, exiting from the top wall. In this way, the user can make use of the consume product 2' directly from container 1.

Another difference resides in the presence of suitable edges, a top edge 1''' and a bottom edge 1'''', respectively defining the edge of the top wall and the edge of the bottom wall.

Figure 4:
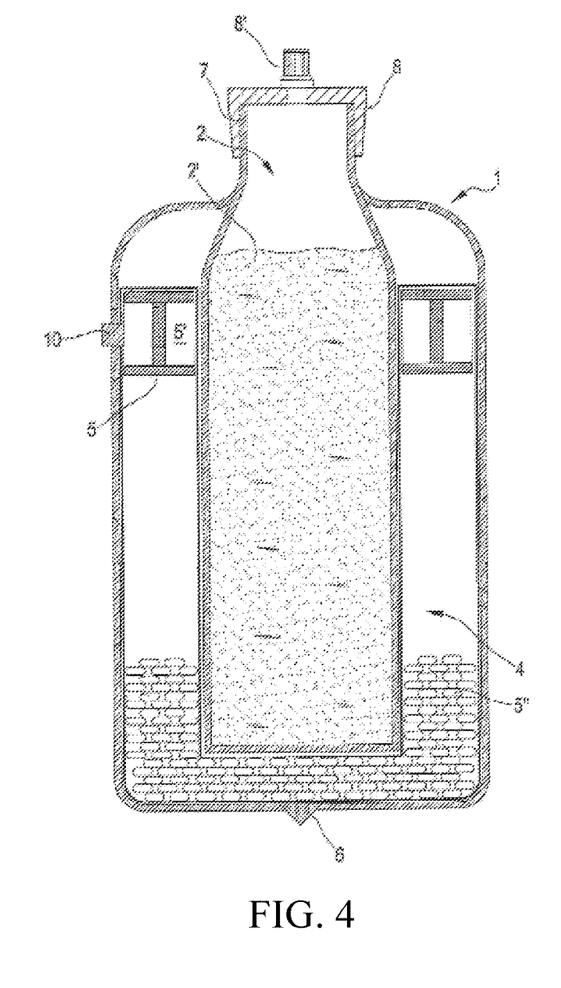
FIG. 4 is a schematic section view of the portable thermal container in a fourth embodiment, according to the present invention.

The fourth embodiment of the portable thermal container 1 for consume product 2', illustrated in FIG. 4, relates to a container of the rigid (or semi-rigid) type, preferably shaped like a bottle and obtained from a plastic mold. As difference from the embodiment above described, the storing chamber 2 is defined in the central section of the portable thermal container 1 and the reaction chamber 4 is arranged perimetrically to the storing chamber 2 along and perpendicular to the largest dimension, defining both the side walls and the bottom wall.

In addition, the reagent component 5' is operatively connected to actuating means 10 able to arrange the reagent component 5' in contact with the reactive component 5" to carry out the chemical reaction. In particular, the reagent component 5' is contained within a containment element 5, illustrated in a closed configuration, operatively connected to the aforementioned actuating means 10. Unlike what is illustrated in the previous embodiments, the actuating means 10 is arranged at the side wall of the container 1. The opening means 8 are defined by a locking element 8 coupled to the neck 7 of the container 1, further provided with a removable cap 8' to allow a fractional use of the consumer product 2'.

According to further embodiments, not illustrated, it is also possible that the reaction chamber is arranged only perimetrically along the storing chamber along the largest dimension, thus defining only the side walls.

Figure 5:
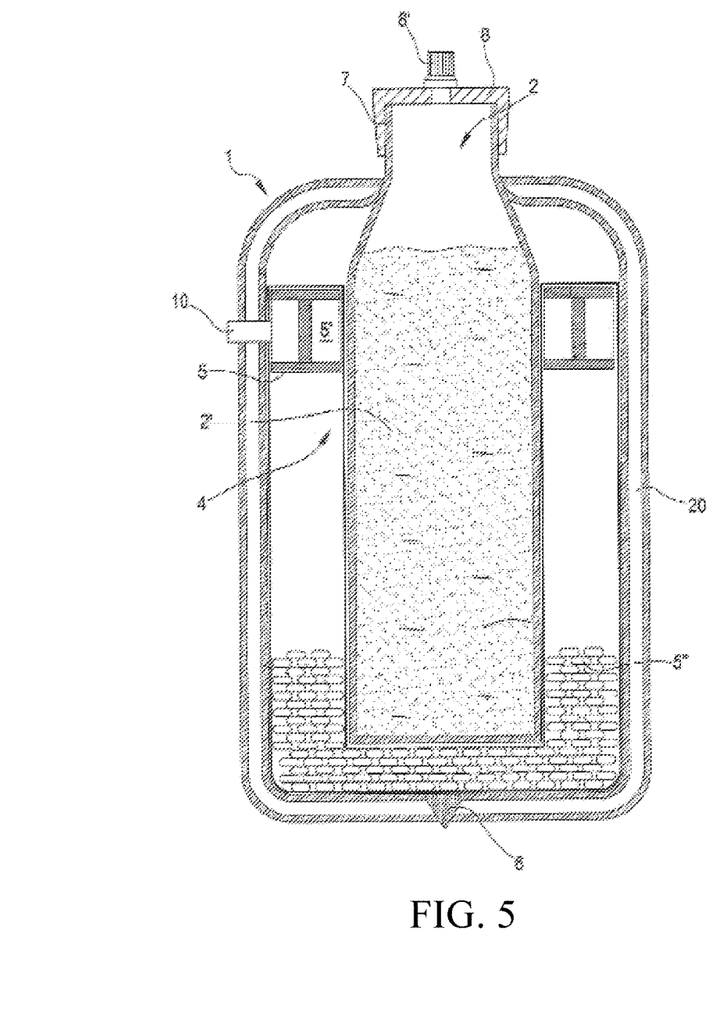
FIG. 5 is a schematic section view of the portable thermal container in a fifth embodiment, according to the present invention.

The fifth embodiment of the portable thermal container 1 for consumer product 2', illustrated in FIG. 5, relates to a container of the rigid (or semi-rigid) type, similar to that described for the previous embodiment, in which the thermal container 1 further comprises a perimetrical interspace 20. This perimetrical interspace 20 defines the side and bottom walls of the container 1 and allows to better isolate the container 1 from the external environment and from the handling of the user.

Figure 6:
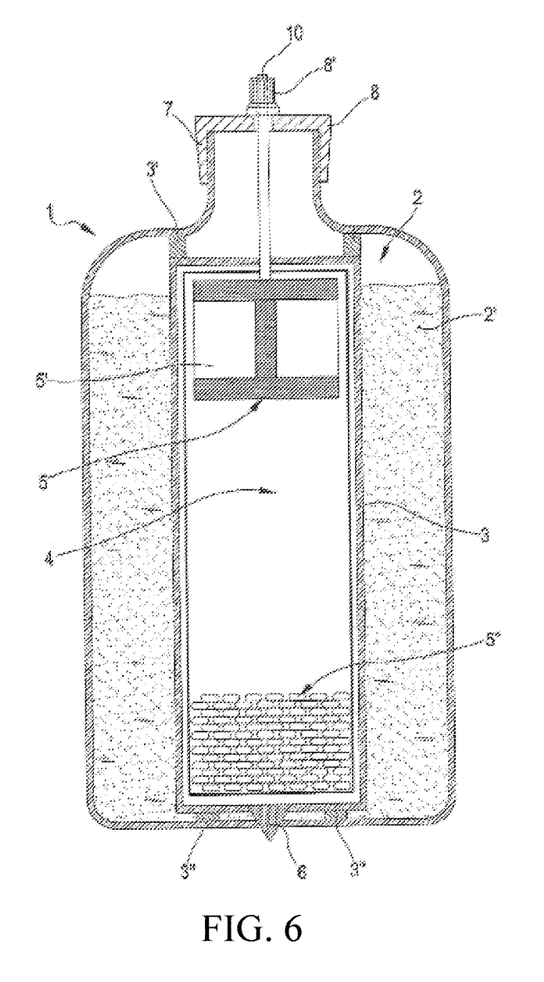
FIG. 6 is a schematic section view of the portable thermal container in a sixth embodiment, according to the present invention.

The sixth embodiment of the portable thermal container 1 for consumer product 2', illustrated in FIG. 6, has characteristics similar to the portable thermal container discussed in the fourth embodiment, with a difference in the positioning of the reaction chamber 4 with respect to the storing chamber 2 and in the actuation means 10, as described in more detail below.

The reaction chamber 4 is made in the central section of the portable thermal container 1, by arranging the storing chamber 2 around it. In particular, the perimeter arrangement is made alongside the walls which extend along the largest dimension of the container 1, the side walls, and perpendicularly to the largest dimension, the bottom wall. In addition, the coupling between the reaction chamber 4 and the storing chamber 2 is achieved by suitable junction elements 3', 3", arranged at the bottom wall and at the opposite top portion.

Unlike what is illustrated in the fourth embodiment, the actuation means 10 are arranged at the upper wall of the container 1 and in correspondent of the opening means 8, preferably concentric to the latter.

Figure 7:
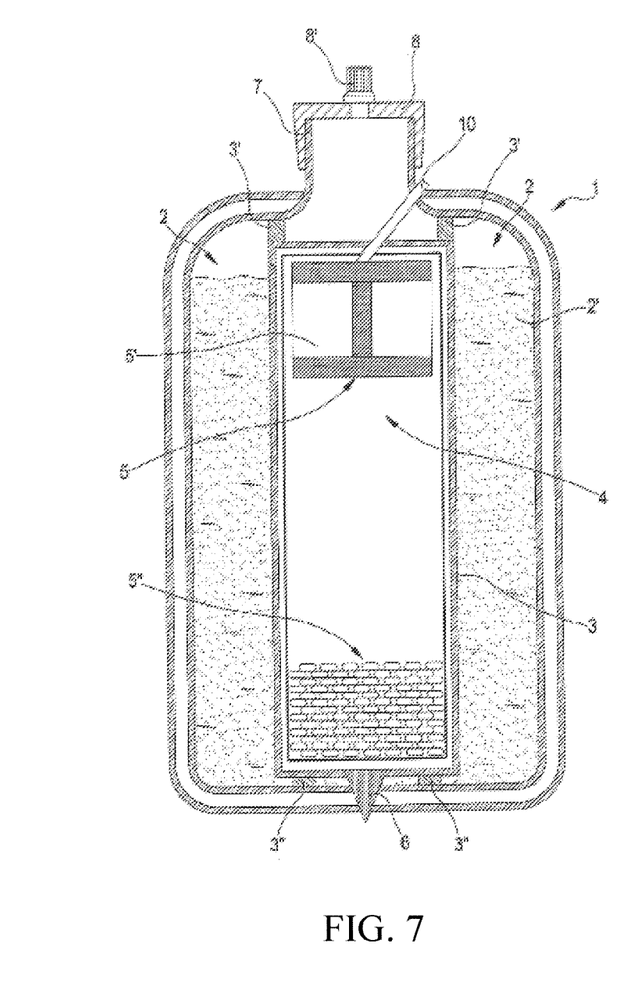
FIG. 7 is a schematic section view of the portable thermal container in a seventh embodiment, according to the present invention.

The seventh embodiment of the portable thermal container 1 for consumer product 2', illustrated in FIG. 7, relates to a container of the rigid (or semi-rigid) type, similar to that described for the previous embodiment, in which the thermal container 1 further comprises the perimetrical interspace 20. Furthermore, the actuation means 10 are arranged at the top portion but separated from the opening means 8.

Figure 8:
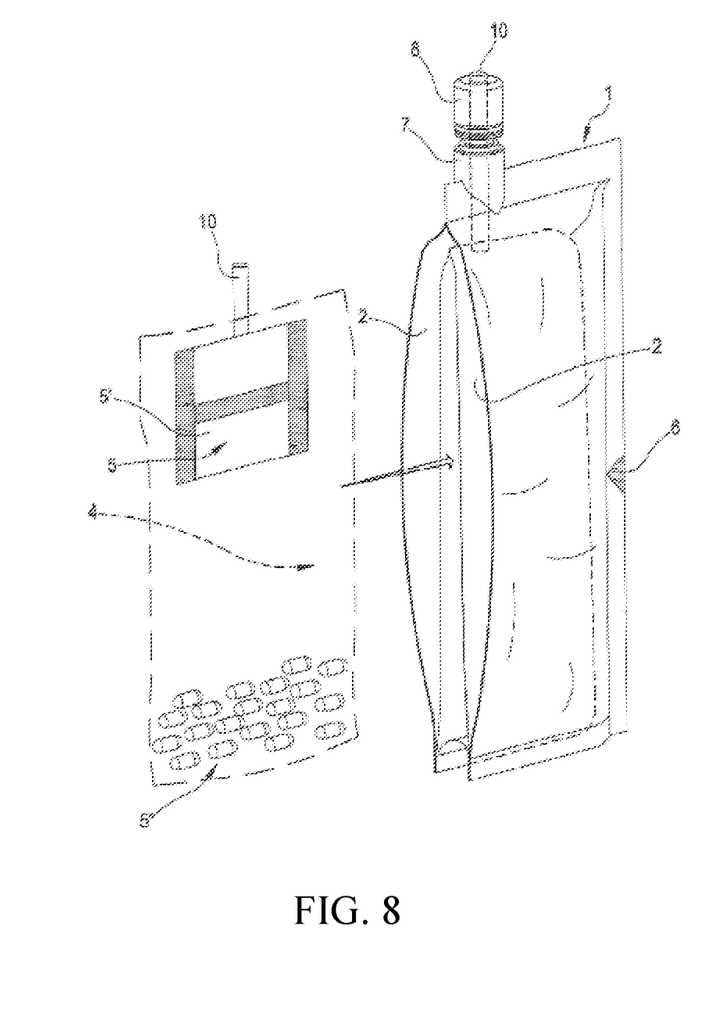
FIG. 8 is a schematic section view of the portable thermal container in an eighth embodiment, according to the present invention.

The eighth embodiment of the portable thermal container 1 for consumer product 2', illustrated in FIG. 8, relates to a bag-type container, preferably "stand-up" and obtained from one or more laminated plastic films. The reaction chamber 4 is defined before the closure of the container 1, or before the closure of the bottom wall. This embodiment can, for example, be achieved by using three sheets of laminated plastic film, in which a first sheet defines the external walls of the container 1, a second sheet defines the internal walls of the container 1 and a third sheet defines the bottom wall which allows to keep in a stand position the container 1. The coupling of the aforesaid sheets, in particular for the construction of the dividing walls between the storing chamber 2 and the reaction chamber 4, can be achieved by heat-sealing or in any other way able to ensure the hermetic seal between the different portions that define the container 1.

Furthermore, unlike the embodiments described above, the safety valve 6 is arranged on one side corresponding to the larger size of the container 1 itself, thereby keeping free the bottom wall, said safety valve 6 being operatively connected with the reaction chamber 4 for the expulsion of the chemical reaction gases when the pressure inside the reaction chamber 4 exceeds a predetermined pressure value.

Figure 9:
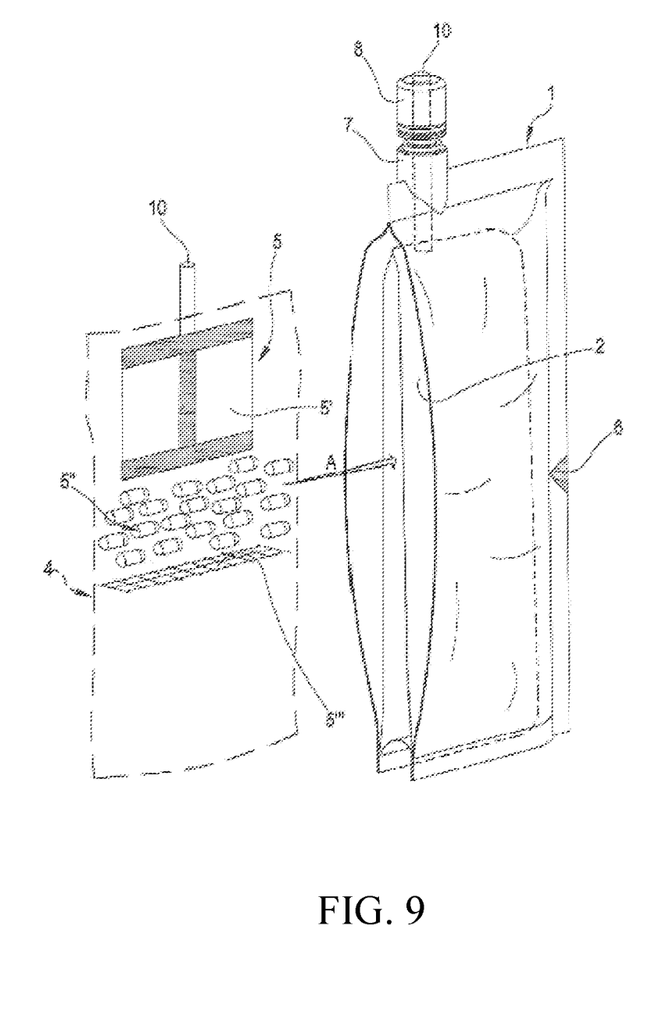
FIG. 9 is a schematic section view of the portable thermal container in a ninth embodiment, according to the present invention.

The ninth embodiment of the portable thermal container 1 for consumer product 2', illustrated in FIG. 9, relates to a bag-type container, preferably "stand-up" and obtained from one or more laminated plastic films, similar to as described for the previous embodiment, in which the storing portion is separated from the expansion portion by the dividing element 5".

Figure 10:
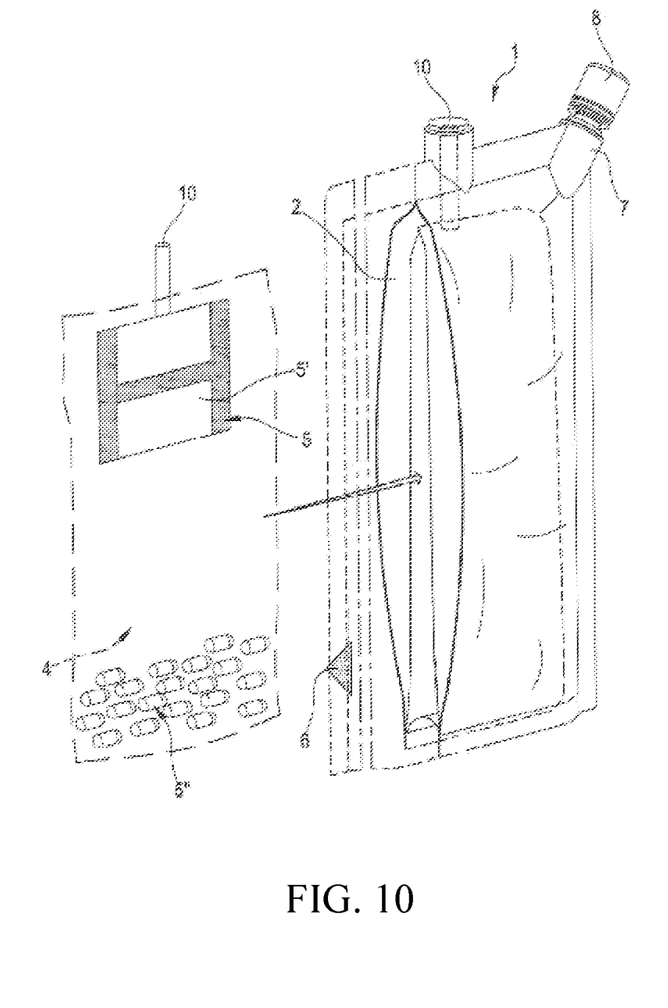
FIG. 10 is a schematic section view of the portable thermal container in a tenth embodiment, according to the present invention.
Figure 11:
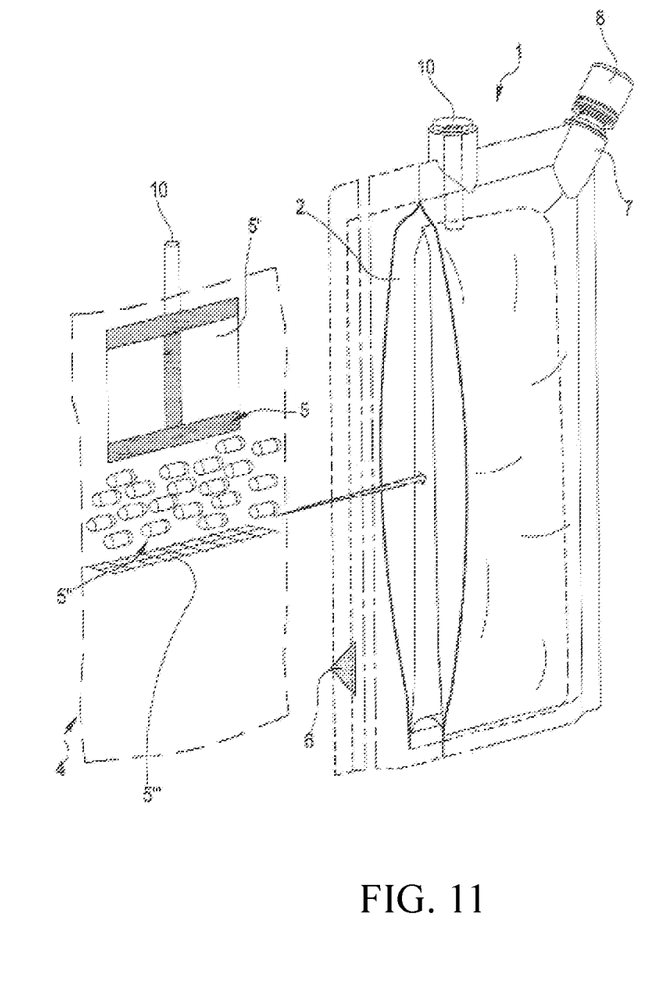
FIG. 11 is a schematic section view of the portable thermal container in an eleventh embodiment, according to the present invention.

The tenth embodiment, FIG. 10, and the eleventh embodiment, FIG. 11, correspond, respectively, to the eighth and ninth embodiments discussed above, in which the opening means 8 are arranged at the top angular portion of the container 1, separated and spaced apart from the actuating means 10.

Figure 12:
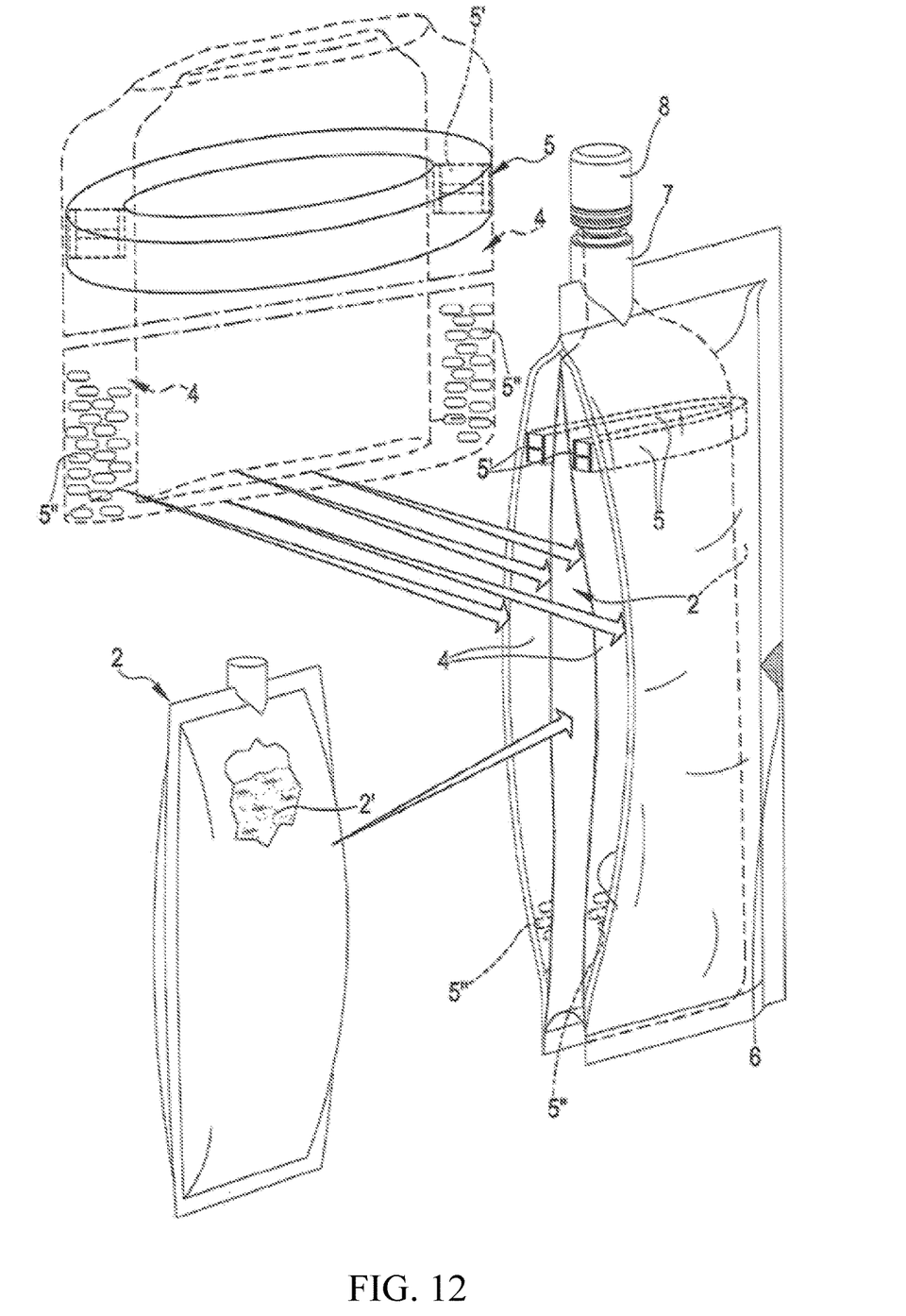
FIG. 12 is a schematic section view of the portable thermal container in a twelfth embodiment, according to the present invention.

Finally, the twelfth embodiment of the portable thermal container 1 for consumer product 2', illustrated in FIG. 12, relates to a bag-type container, preferably "stand-up" and obtained from one or more laminated plastic films, similar to that described for the eighth embodiment, in which the storing chamber 2 is made in the central section of the portable thermal container 1 and the reaction chamber 4 is perimetrical arranged to the storing chamber 2 along the largest dimension, defining the side walls of the container 1 itself.

Although the illustrated and described embodiments refer to actuating means to allow contact between the reactant reagent component and the reactive component, it is also possible to define containers according to the present invention which do not have the aforementioned actuation means, wherein the contact can be carried out by pressing on the container itself to break at least one of the containers suitable for storing the reagent component or the reactive component.

The invention claimed is:

1. A portable thermal container for consumer products comprising at least a storing chamber of said consumer products and at least a reaction chamber of a reagent component and of a reactive component,
wherein said storing chamber and said reaction chamber are hermetically separated,
wherein said reagent component and said reactive component are separated from each other and able to carry out a chemical heating or cooling reaction when in contact, respectively to heat or to cool said consumer products, wherein said reagent component is operatively connected to actuating means able to arrange said reagent component in contact with said reactive component for carrying out said chemical reaction,
and wherein said reaction chamber extends substantially entirely along the dimension of the largest dimension of said portable thermal container and said storing chamber is arranged side-by-side to said reaction chamber to maximize the thermal exchange between said reaction chamber and said storing chamber in a homogeneous way, wherein said reaction chamber comprises at least a storing portion, each comprising said reagent component and/or said reactive component,
and at least an expansion portion, devoid of said reagent component and of said reactive component, wherein the total volume of said expansion portions is greater than the total volume of said storing portions to allow the safe expansion of the chemical reaction gases in said reaction chamber and wherein the total volume of said storing portions is less than or equal to 30% of the total volume of said reaction chamber, preferably less than or equal to 22% of the total volume of said reaction chamber.

2. The portable thermal container according to claim 1, wherein said reaction chamber is made in the central section of said portable thermal container, and wherein said storing chamber is arranged perimetrical to said reaction chamber along said largest dimension.

3. The portable thermal container according to claim 2, wherein said storing chamber is arranged perimetrical to said reaction chamber along and perpendicular to said largest dimension.

4. The portable thermal container according to claim 1, wherein said storing chamber is made in the central section of said portable thermal container, and wherein said reaction chamber is arranged perimetrical to said storing chamber along said largest dimension.

5. The portable thermal container according to claim 4, wherein said reaction chamber is arranged perimetrical to said storing chamber along and perpendicular to said largest dimension.

6. The portable thermal container according to claim 1, wherein said reaction chamber is symmetric with respect to an axis of symmetry (A) defined along said largest dimension of said thermal container.

7. The portable thermal container according to claim 1, wherein said reagent component and said reactive component are adjacent arranged in said storing portion.

8. The portable thermal container according to claim 1, wherein said reagent component is arranged in a first storing portion and said reactive component is arranged in a second storing portion, and wherein said expansion portion is interposed between said first storing portion and said second storing portion.

9. The portable thermal container according to claim 1, wherein said storing portion is separated from said expansion portion by a dividing element.

10. The portable thermal container according to claim 1, wherein said reagent component is contained within a containment element operatively connected to said actuating means, and
   wherein said actuating means has a predetermined actuating load and is able to arrange said reagent component in contact with said reactive component for carrying out said chemical reaction upon exceeding said predetermined actuating load.

11. The portable thermal container according to claim 1, wherein said actuating means is arranged at said opening means of said storing chamber.

12. The portable thermal container according to claim 1, wherein said portable thermal container comprises a safety valve (6) operatively connected with said reaction chamber for the expulsion of said chemical reaction gases when the pressure inside said reaction chamber exceeds a predetermined pressure value.

13. The portable thermal container according to claim 1, wherein said thermal container comprises a perimetrical interspace.

14. A portable thermal container for consumer products comprising at least a storing chamber of said consumer products and at least a reaction chamber of a reagent component and of a reactive component, wherein said storing chamber and said reaction chamber are hermetically separated, wherein said reagent component and said reactive component are separated from each other and able to carry out a chemical heating or cooling reaction when in contact, respectively to heat or to cool said consumer products,
   and wherein said reaction chamber extends substantially entirely along the dimension of the largest dimension of said portable thermal container and said storing chamber is arranged side-by-side to said reaction chamber to maximize the thermal exchange between said reaction chamber and said storing chamber in a homogeneous way, wherein said reaction chamber comprises at least a storing portion, each comprising said reagent component and/or said reactive component, and at least an expansion portion, devoid of said reagent component and of said reactive component, wherein said storing portion is separated from said expansion portion by a dividing element,
   wherein the total volume of said expansion portions is greater than the total volume of said storing portions to allow the safe expansion of the chemical reaction gases in said reaction chamber, and wherein the total volume of said storing portions is less than or equal to 30% of the total volume of said expansion reaction chamber, preferably less than or equal to 22% of the total volume of said expansion reaction chamber.

* * * * *